US012526570B2

(12) United States Patent
Hui

(10) Patent No.: US 12,526,570 B2
(45) Date of Patent: *Jan. 13, 2026

(54) VOICE COMMUNICATION IN HOSTILE NOISY ENVIRONMENT

(71) Applicant: BITwave Pte Ltd, Singapore (SG)

(72) Inventor: Siew Kok Hui, Singapore (SG)

(73) Assignee: BITWAVE PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,923

(22) Filed: Jun. 13, 2024

(65) Prior Publication Data

US 2024/0334114 A1 Oct. 3, 2024

Related U.S. Application Data

(63) Continuation of application No. 17/812,938, filed on Jul. 15, 2022, now Pat. No. 12,052,538.

(Continued)

(51) Int. Cl.

*H04R 5/027* (2006.01)
*H04R 1/10* (2006.01)

(52) U.S. Cl.

CPC ......... *H04R 1/1083* (2013.01); *H04R 1/1016* (2013.01); *H04R 1/1066* (2013.01); *H04R 2460/13* (2013.01)

(58) Field of Classification Search

CPC ........ A42B 3/30; H04R 1/1083; H04R 3/005; H04R 1/46; H04R 2410/05; H04R 2460/13

See application file for complete search history.

(56) References Cited

U.S. PATENT DOCUMENTS 3,787,641 A * 1/1974 Santori .................... H04R 1/46 381/151
5,438,702 A * 8/1995 Jackson ................... A42B 3/30 455/100

(Continued)

FOREIGN PATENT DOCUMENTS

WO WO-0021194 A1 * 4/2000 ............. H03G 3/301
WO WO-2004030400 A2 * 4/2004 ............... A42B 3/16
WO WO-2019117806 A1 * 6/2019

OTHER PUBLICATIONS

Notice of Allowance mailed Mar. 14, 2024 for U.S. Appl. No. 17/812,938, 23 pages.

*Primary Examiner* — Ryan Robinson
(74) *Attorney, Agent, or Firm* — Amin, Turocy & Watson, LLP

(57) ABSTRACT

Voice communication in hostile noisy environment is described. An example apparatus is integral with or attachable to a headgear including a multi-sensor array having a bone conduction microphone, an air conduction microphone, signal processor, a cushioned bendable material and audio output devices, such as speakers or headphones. A signal processor can be included that processes vibration signal data and tonal signal data to produce combined data representative of the vocal communication to substantially reduce or eliminate noise. A signals optimized combination process can be used to optimize the output by intelligently combining the outputs from the two different types of sensors for both to cooperate in a hostile noise environment to suppress or eliminate such noise.

20 Claims, 11 Drawing Sheets

Related U.S. Application Data

(60) Provisional application No. 63/245,152, filed on Sep. 16, 2021.

(56) References Cited

U.S. PATENT DOCUMENTS

| | | | | | |
|---|---|---|---|---|---|
| 5,790,681 | A * | 8/1998 | Leppalahti | H04R 1/10 381/370 |
| 7,383,181 | B2 * | 6/2008 | Huang | G10L 15/20 704/E15.041 |
| 7,813,923 | B2 * | 10/2010 | Acero | G10L 21/02 704/226 |
| 8,233,947 | B2 * | 7/2012 | Kushnirov | A42B 3/30 455/90.3 |
| 8,675,884 | B2 * | 3/2014 | Yehuday | H04R 1/1083 181/129 |
| 8,751,224 | B2 * | 6/2014 | Herve | G10L 21/0364 704/226 |
| 9,036,844 | B1 * | 5/2015 | Suhami | A61N 7/02 381/316 |
| 10,204,637 | B2 * | 2/2019 | Forte | H04R 3/04 |
| 10,699,691 | B1 * | 6/2020 | Ye | G10K 11/17881 |
| 11,058,165 | B2 * | 7/2021 | Smith | A42B 3/30 |
| 2023/0352038 | A1 * | 11/2023 | Chen | H04R 1/1083 |

* cited by examiner

VOICE COMMUNICATION IN HOSTILE NOISY ENVIRONMENT

RELATED APPLICATION

The subject patent application is a continuation of, and claims priority to, U.S. patent application Ser. No. 17/812,938 (now U.S. Pat. No. 12,052,538), filed Jul. 15, 2022, and entitled "VOICE COMMUNICATION IN HOSTILE NOISY ENVIRONMENT," each of which applications claim priority to U.S. Provisional Patent Appln. No. 63/245,152, filed Sep. 16, 2021, entitled "System and Apparatus for Voice Communication in Hostile Noisy Environment". The entireties of the aforementioned priority applications are hereby incorporated by reference herein.

TECHNICAL FIELD

The present application is in the field of sensors for speech communication and relates to a hands-free Bluetooth helmet headset communication system embedded with multi-acoustic sensors, e.g., for audio signal acquisition, echo cancellation, interference sound cancellation, extreme wind noise, and/or environment noise reduction and noise cancellation, and further relates to facilitating audio applications using such headset communication system.

BACKGROUND

In a conventional helmet communicator, normally one or two microphones are embedded into helmet communicator. In order to have a better signal-to-noise ratio, some devices are embedded with two microphones so that the beamforming technique can be used. These devices, such as the Bluetooth helmet headset, are designed for people on the move and for when an uninterrupted connection in an outdoor situation is necessary. Using adaptive beamforming techniques, the outdoor noise can be effectively reduced using basic digital signal processing techniques. However, wind noise is random and can severely degrade the system performance and even render the device completely unusable. Wind noise covers almost the entire speech frequency spectrum and to suppress wind noise, using digital signal processing techniques such as adaptive beamforming and noise suppression methods, remains a challenge. Further, in order to enhance the signal-to-noise ratio, sometimes directional microphones are used instead of omni-directional microphones. However, directional microphones, such as cardioid microphones, are known to be susceptible to wind noise compared to omni-directional microphones. Some conventional Bluetooth helmet headset communicators use a close talking bi-directional microphone or boom microphone with a thick wind filter. This approach can help to cut down on the environmental noise, but faces a more severe problem. In this regard, when a close talking bi-directional microphone or a boom microphone with a thick wind filter is used during fast speed rides, such as on snowmobiles, motorbikes, open top vehicles, gliders and light vessels, wind noise remains an issue due to the directional microphones being susceptible to such wind noise. While such design provides a voice input channel to the headset, the 'boom' of the microphone imposes an awkward industrial design issue to the overall appearance of the headset. Also, the design of the 'boom' microphone normally involves movable mechanical parts. This affects device durability and the manufacturing cost. Thus, conventional devices using the boom microphone have not been practical.

Recently, a small array has been proposed for use in mobile devices, such as headsets. The small array consists of two omni-directional microphones spaced at about 2.1 cm apart for a 16 KHz sampling frequency. For an 8 KHz sampling rate, the spacing between the microphones is doubled to 4.2 cm apart. The small array forms a beam that points at the user's mouth. It can also form an area on its back plane to nullify an interference source. However, the small array is only effective for a near field source. Further, the 2.1 cm spacing requirement can also be a challenge for small mobile devices. Furthermore, this small array is also susceptible to wind noise.

The above-described background relating to audio processing of communication devices is merely intended to provide a contextual overview of some current issues pertaining to some conventional technologies, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

The present application provides various embodiments for a wearable array using two different types of sensors, and, inter alia, a unique processing method and a unique structure to effectively suppress wind noise and environmental noise. The wearable array enables the device to be used in extreme wind conditions and hostile noise conditions, such as when riding a bike, snowmobile, riding an all-terrain vehicle (ATV), or even skydiving.

An example embodiment of the present application provides an apparatus integral with, or attachable to, a protective headgear, comprising a cushioned bendable material integral with, or attachable to, an inside of a top part of the protective headgear. The apparatus comprises a bone conduction microphone that is integral with, or attachable to, the protective headgear, and is positioned to make contact with a user of the protective headgear at least one of at a first area in front of an ear of the user, at a second area behind the ear of the user, at a third area at a forehead of a head of the user, or at a fourth area at a top of the head of the user. The apparatus further comprises an air conduction microphone that is integral with, or attachable to, the protective headgear at a fifth area located at or near a mouth of the user. The apparatus can further comprise a signal processor that processes first signal data from the bone conduction microphone and second signal data from the air conduction microphone to produce combined data representative of a vocal communication of the user, wherein at least one of a first noise associated with the bone conduction microphone or a second noise associated with the air conduction microphone are eliminated or substantially removed from at least one of the first signal data or the second signal data, respectively, in producing the combined data.

Another example embodiment of an apparatus integral with, or attachable to, a protective headgear relates to an apparatus, wherein the bone conduction microphone is embedded in a housing of rubberized foam.

Another example embodiment of an apparatus integral with, or attachable to, a protective headgear relates to an apparatus, wherein the bone conduction microphone is in a housing comprising: rubberized foam, a Velcro embedded rubber housing, and a printed circuit board.

Another example embodiment of an apparatus integral with, or attachable to, a protective headgear relates to an apparatus, wherein the housing comprises a hard plastic portion or a metal portion that contacts the bone conduction microphone directly and a part of the head of the user directly.

Another example embodiment of an apparatus integral with, or attachable to, a protective headgear relates to an apparatus, wherein the air conduction microphone comprises at least one of an omnidirectional microphone or a unidirectional microphone.

Another example embodiment of an apparatus integral with, or attachable to, a protective headgear relates to the apparatus further comprising at least one of a pair of loudspeakers or a pair of in-ear earbuds.

Another example embodiment of an apparatus integral with, or attachable to, a protective headgear relates to the apparatus further comprising soft foam between the bone conduction microphone and the air conduction microphone.

Another example embodiment of an apparatus integral with, or attachable to, a protective headgear relates to the signal processor comprising an acoustic echo canceller that removes or substantially removes, from the combined signal, echo signals that result from acoustic coupling between at least one of the bone conduction microphone and a speaker that renders the vocal communication of the user, or the air conduction microphone and the speaker.

Another example embodiment of an apparatus integral with, or attachable to, a protective headgear relates to the first signal data being represented as a first fast Fourier transform of the vibration signal, the second signal data being represented as a second fast Fourier transform of the tonal signal, and the signal processor processing the vibration signal data and the tonal signal data to produce the combined data comprising the signal processor determining whether a first running average energy of the vibration signal is greater than a second running average energy of the tonal signal.

Another example embodiment of an apparatus integral with, or attachable to, a protective headgear relates to the signal processor processing the vibration signal data and the tonal signal data to produce the combined data comprising, in response to the first running average energy being determined to be greater than the second running average energy, applying a function of the optimized signal gain normalization multiplied by the fast Fourier transform of the output of the bone conduction sensor.

Another example embodiment of an apparatus integral with, or attachable to, a protective headgear relates to the signal processor processing the vibration signal data and the tonal signal data to produce the combined data comprising, in response to the first running average energy being determined to be less than the second running average energy, applying a function of the optimized signal gain normalization multiplied by the fast Fourier transform of the output of the air conduction sensor.

Another example embodiment of an apparatus integral with, or attachable to, a protective headgear relates to the combined signal being output from the headgear apparatus to the device for at least one of performing a command by the device associated with a voice command determined to be present in the vocal sound of the combined signal, storing the vocal sound by the other device, or communicating the vocal sound to at least one other device in communication with the device.

Another example embodiment of an apparatus integral with, or attachable to, a protective headgear relates to an apparatus, comprising: a cushioned bendable material integral with, or attachable to, an inside of a top part of gear that is wearable by a head of a user, a bone conduction microphone integral with, or attachable to, the protective headgear, and positioned to make contact with a user of the protective headgear at, at least one of a first area in front of an car of the user, a second area behind the ear of the user, a third area at a forehead of a head of the user, or a fourth area at a top of the head of the user, an air conduction microphone integral with, or attachable to, the protective headgear at a fifth area located at or near a mouth of the user, and a signal processor that processes first signal data from the bone conduction microphone and second signal data from the air conduction microphone to produce combined data representative of a vocal communication of the user, wherein at least one of a first noise associated with the bone conduction microphone or a second noise associated with the air conduction microphone are eliminated or substantially removed from at least one of the first signal data or the second signal data, respectively, in producing the combined data.

Another example embodiment of an apparatus integral with, or attachable to, a protective headgear relates to the signal processing unit processing the vibration signal data and the tonal signal data to produce the combined data comprising the signal processing unit enhancing a defined high frequency band of frequencies represented in at least the vibration signal data.

Another example embodiment of an apparatus integral with, or attachable to, a protective headgear relates to the combined signal being output from the headgear apparatus to the device for at least one of performing a command by the device associated with a voice command determined to be present in the vocal sound of the combined signal, storing the vocal sound by the other device, or communicating the vocal sound to at least one other device in communication with the device.

Another example embodiment of an apparatus integral with, or attachable to, a protective headgear relates to the bone conduction microphone being in a housing comprising: rubberized foam, a Velcro embedded rubber housing, and a printed circuit board;

Another example embodiment of an apparatus integral with, or attachable to, a protective headgear relates to the housing comprising a hard plastic portion or a metal portion that contacts the bone conduction microphone directly and a part of the head of the user directly.

Another example embodiment of the present application provides a method, comprising: determining, by a signal processor of a headwear system, vibration signal data from a vibration signal representative of vocal sound from a user sensed via a bone conduction microphone positioned to make contact with a user of the headwear at, at least one of a first area in front of an ear of the user, a second area behind the ear of the user, a third area at a forehead of a head of the user, or a fourth area at a top of the head of the user. The method further comprises determining, by the signal processor, sound signal data from a sound signal received representative of the vocal sound that was sensed by an air conduction microphone by air, wherein the air conduction microphone is positioned at a front of the headwear system to receive the sound signal via air, and away from the bone conduction microphone to decrease an interference between the bone conduction microphone and the air conduction microphone relative to closer positioning of the bone conduction microphone and the air conduction microphone. The method can further comprise processing, by the signal processor, the vibration signal data and the sound signal data to generate combined signal data representative of the vocal sound that increases a signal to noise ratio of the vocal sound of the combined signal data relative to the vocal sound as represented in the vibration signal data or the vocal sound as represented in the sound signal data, the processing comprising suppressing residual noise represented in the combined signal, resulting in processed combined signal data. The method can further comprise outputting, by the signal processor via radio frequency circuitry, the processed combined signal data to a user device for further usage by an application or service executed in connection with the user device.

Another example embodiment of the present application relates to the method further comprising applying, by the signal processor, adaptive noise suppression to defined frequency bands of the combined signal for further suppression of noise represented in the combined signal.

Another example embodiment of the present application relates to the method further comprising applying, by the signal processor, high frequency enhancement of frequencies represented in the combined signal that are in a defined high frequency range.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, or with other methods, components, materials, etc. In other instances, well-known structures, materials, or operations are not shown or described in detail to avoid obscuring certain aspects.

Reference throughout this specification to “one embodiment,” or “an embodiment,” means that a particular feature, structure, or characteristic described in connection with the embodiment is included in at least one embodiment. Thus, the appearances of the phrase “in one embodiment,” “in one aspect,” or “in an embodiment,” in various places throughout this specification are not necessarily all referring to the same embodiment. Furthermore, the particular features, structures, or characteristics may be combined in any suitable manner in one or more embodiments.

Figure 1:
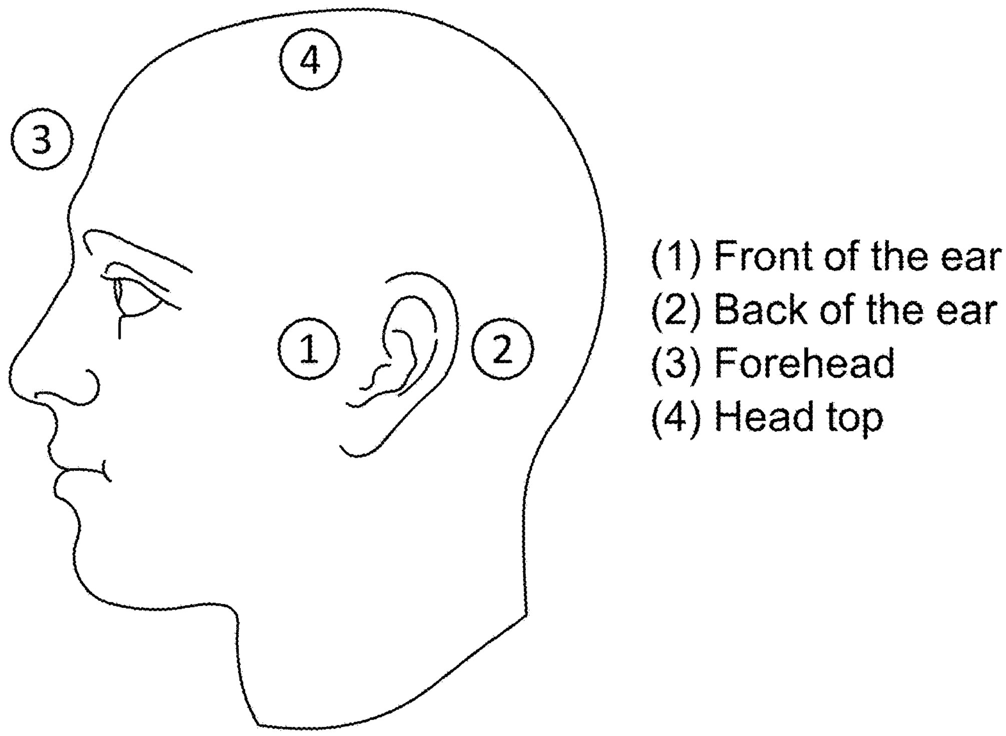
FIG. 1 illustrates possible locations of the bone conduction sensor.

A main application for one or more embodiments is for wireless voice communication in hands-free mode in extreme noise environments. In this regard, bone-conduction microphones can be used to help solve both the environmental noise and the wind noise issues noted in the background. However, for a bone-conduction microphone to function effectively, the bone-conduction microphone is positioned to make threshold acceptable or good contact with the user’s skin surface in the head area, e.g., pressured contact. In this regard, FIG. 1 illustrates possible locations relative to the head area to place the bone conduction sensor for good signal detection via the contact with the user’s skin surface. However, if there is not good, or intermittent, contact between the sensor and the human skin surface, many high frequency signals can be lost-leading to poor communication quality and causing the bone microphone to operate poorly or dysfunctionally. However, maintaining threshold acceptable or good contact can become intrusive where significant discomfort is caused to the user on the contact point of the user’s skin surface, outweighing the benefits of the system, defeating the case of use of the system, and frustrating the purpose of the system.

Referring to FIG. 1, considering variations and alternative embodiments of a bone conduction microphone, headphone(s) and corresponding vibrational sound output, a vibration generating component is able to be secured above the skin to any of the skull bones on a user and is able to be vibrated to transmit such vibrations via the bones of the user’s skull to stimulate the inner ear to create the perception of sound in the user.

In this regard, a vibration generating component is adapted to be in contact above the skin for receipt of a signal by electromagnetic coupling from an output transmitter for causing vibration of the skull. The vibration generating component includes an attachment element to facilitate securing the vibration generating component to a skull bone of the user. The vibration generating component can be, for example, a bone conduction headphone or pair of bone conduction headphones.

FIG. 1 illustrates areas of the user's skull where a speech signal can be picked up by a bone conduction sensor, e.g., 1) in front of the ear, 2) behind the ear, 3) on the forehead, and 4) on the top of the head. For helmet communication, with one or more of the various embodiments of the subject application, a structure can be installed in a helmet to ensure that a bone acoustic sensor effectively comes into contact with a user's vertex. Other headwear can also be used such as hats, headsets, headbands, skullcaps, and the like.

Although in one embodiment, the vertex on the top of the skull is selected, as mentioned, some other locations of a user that can be utilized include the right temple, the left temple, behind the right ear, behind the left ear, or on the forehead. In one embodiment, direct bone transmission is used, which enables hearing to be maintained via a system independent of air conduction and the inner ear although integrated with an air conduction system. Further, devices, such as bone conduction headphones, can be used.

Figure 3A:
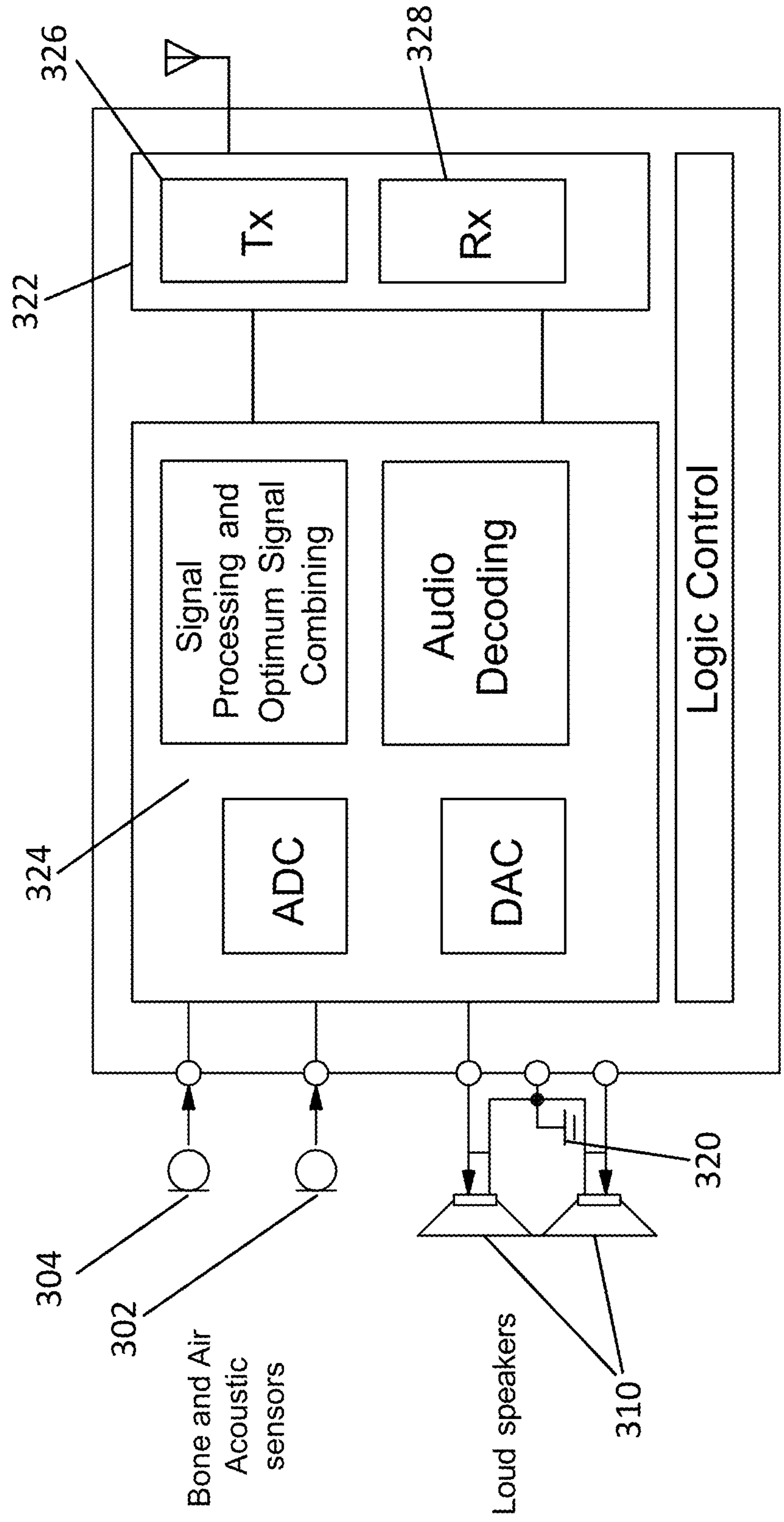
FIG. 3*a* illustrates an example overall system block diagram.
Figure 3B:
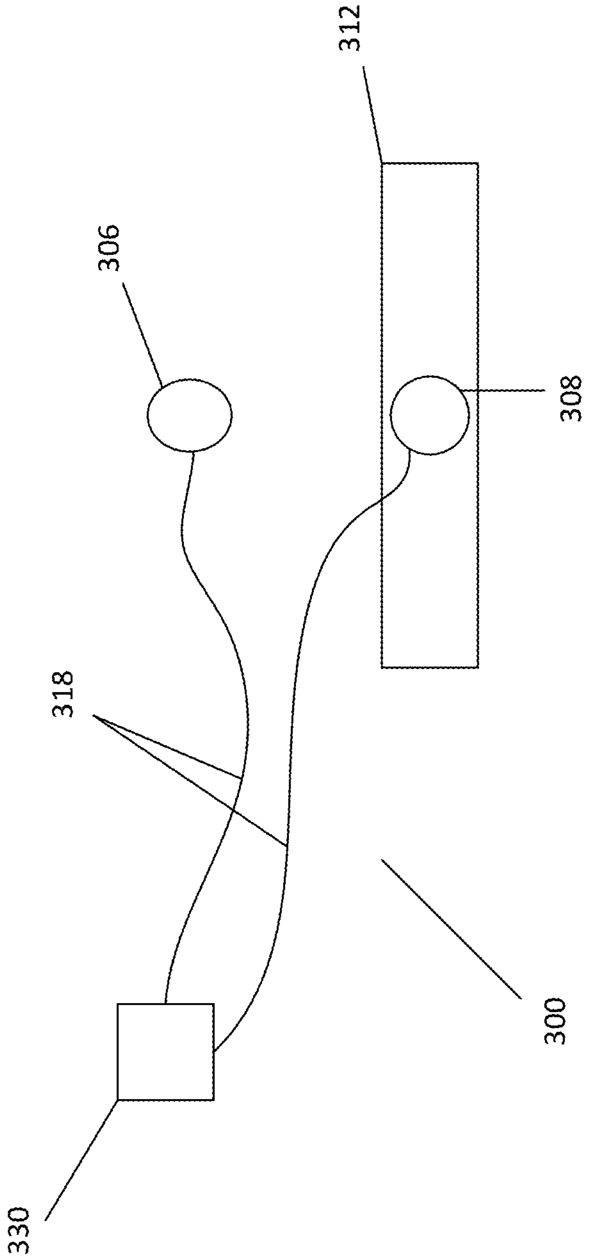
FIG. 3*b* illustrates a diagram of an example general structure of the multi-sensor array.

Referring to the non-limiting example embodiments of FIGS. 3*a* and 3*b*, the bone conduction microphone 304, the air conduction microphone 302, and speaker 310 are suitably connected to the transceiver 322 and transceiver circuitry by suitable leads 318. As can be understood from FIG. 3, the multi-sensor array 300 may further include a suitable battery 320 which may reside in a recess formed in the outer portion of the cushioned bendable material 306; battery 320 can be suitably connected to the transceiver 322 by leads 318 to provide energy to the transceiver 322, bone conduction microphone 304, air conduction microphone 302, and speakers 310.

Referring again to FIGS. 3*a* and 3*b*, there is illustrated diagrammatically a further embodiment of the present application which includes the above-described combination head-protective apparatus and multi-sensor array 300 mounted thereon. In addition, the combination head-protective apparatus and multi-sensor array 300 includes the bone conduction microphone 304, the air conduction microphone 302, and speaker 310 as being worn by the user, and which was described above as being for relatively long-range communications between users. It will be understood that, in this embodiment, a signal processor 324 processes the vibration signal data and the tonal signal data, to produce combined data representative of the vocal communication that substantially reduces or eliminates at least one of a first noise associated with the vibration signal data or a second noise associated with the tonal signal data.

The combination of an air conduction microphone 302 and a bone conduction microphone 304 provides an increased, e.g., the highest possible, level of speech intelligibility and speech quality in both very noisy environments and in quiet and calm conditions. Some low frequency signals are categorized as wind noise while other intrusive sounds are recognizable as having characteristic frequencies higher than those associated with speech. In this regard, the system described in FIG. 3 can hide the wind noise in a sound signal effectively, as well as other intrusive sounds.

A bone conduction microphone 304, at a first position within the cushioned bendable material, obtains vibration signal data representative of a vibration signal associated with vibration of the user's area of skull bone. The user area of skull bone can be located in front of an car of the user, a second area behind the ear of the user, a third area at a forehead of a head of the user, or a fourth area at a top of the head of the user, that contacts or substantially contacts the bone conduction microphone 304. See FIG. 1. The vibration signal results from vocal communication of the user. The bone conduction microphone 304 is extremely sensitive. Therefore, the bone conduction microphone 304 is susceptible to radio frequency (RF) interference. A bone conduction sensor amplifier design as described herein can place the bone conduction sensor away from the transceiver 322 RF source relative to the RF interference, to significantly reduce RF interference and to provide a clean signal output to a processor board. The transceiver 322 comprises a radio frequency transmitter 326 that transmits the vocal communication of the user to another device and a radio frequency receiver 328 that receives other communications from other devices. The other devices can be user equipment or Internet of Things devices.

Referring now to FIG. 3*b*, an air conduction microphone 306 is at a second position away from the first position of the bone conduction microphone 308. The air conduction microphone 306 obtains tonal signal data representative of a tonal signal, received by the air conduction microphone 306 via air and representative of the vocal communication of the user. The second position can be towards the front of the protective headgear relative to the first position. The first position within the cushioned bendable material 312 at the inside of the top part of the protective headgear, the bone conduction microphone 308 can be substantially isolated from other vibrational signals. Other vibration signals comprise signals resulting from wind impacting the headgear or from external environment sound generated outside of the headgear impacting the headgear. The external environment sound can comprise motor sound generated by a motor or engine. The bone conduction microphone 308, the air conduction microphone 306 are suitably connected to the transceiver 330 and transceiver circuitry by suitable leads 318.

The signal processing unit, such as signal processing unit 324 from FIG. 3, processes the vibration signal and the sound signal, to generate a combined signal representative of the vocal sound that substantially reduces at least one of a first noise associated with the vibration signal or a second noise associated with the sound signal, and that outputs the combined signal from the headgear apparatus to a device for further use or processing. The signal processing unit 324 processes the vibration signal data and the tonal signal data to produce the combined data. The signal processing unit can enhance a defined high frequency band of frequencies represented in at least the vibration signal data.

The apparatus 300 can be wirelessly or wire-linked to a base station such as a mobile device. The combined signal is output from the apparatus 300 to a base station for performing a command by the device associated with a voice command determined to be present in the vocal sound of the combined signal, storing the vocal sound by the other device, or communicating the vocal sound to at least one other device in communication with the device.

Figure 5:
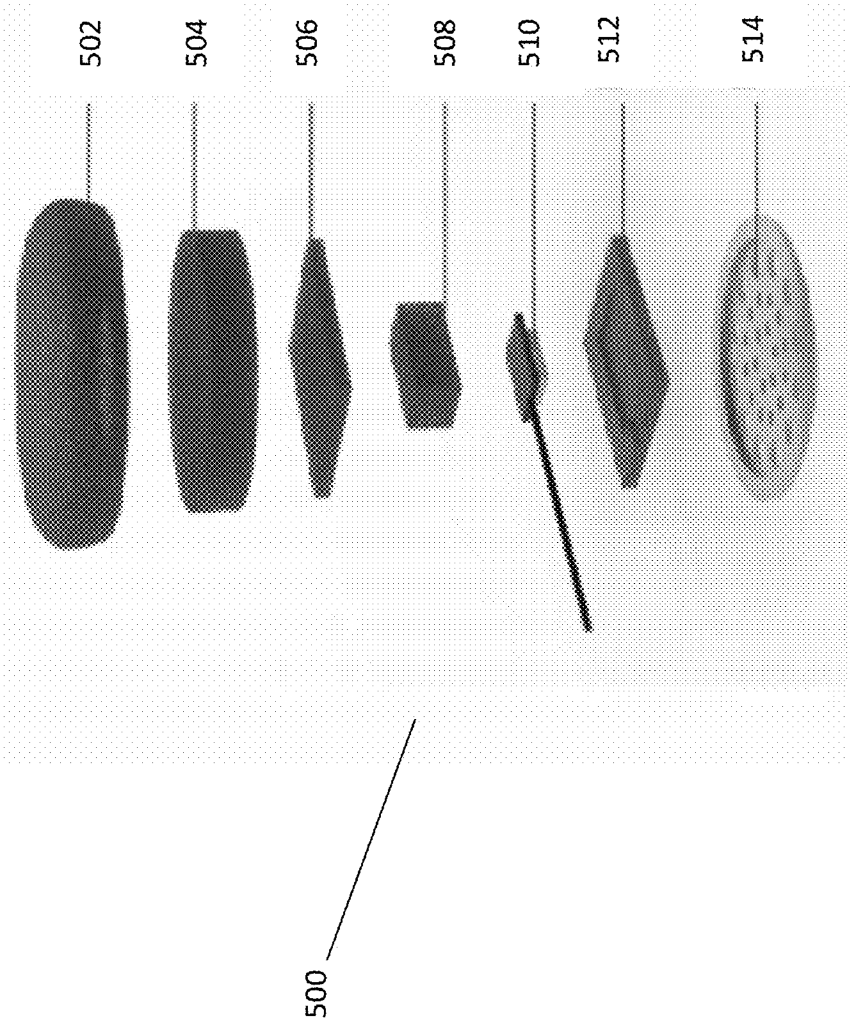
FIG. 5 illustrates an exploded view of an example housing in accordance with one or more embodiments described herein.

Referring to the example, non-limiting embodiments of FIG. 5, a bone conduction microphone 510 is manually activated by touching the sensor to the vertex of the skull. The cushioned bendable material can include electrical contacts disposed around respective ends of the bone conduction microphone 510 to provide readings of communication. The encased bone conduction microphone 510 in the compressible foam material 502 to make a pressured contact with the head at the user vertex. In some embodiments, the electrical contacts can comprise adhesive copper foil, conductive paint, conductive glue, or the like. Conductive wires can be used to provide electrical connections to electrical contacts by soldering or by means of conductive glue. The resistance change between wires can be converted to a voltage output by the circuitry.

The bone conduction microphone is embedded in the cushioned bendable material and positioned to face a user vertex at a top portion of the user's skull. The bone conduction microphone 510 senses a vibration signal, representative of vocal sound from the user, from a corresponding vibration of the user vertex at the top portion of the skull. The bone conduction microphone 510 being embedded at the top portion substantially isolates the vibration signal sensed by the bone conduction microphone 510 from mechanical vibrations resulting from wind on the gear or air vibrations resulting from external sound on the gear from external environment sound generated outside of the gear. The bone conduction microphone 510 being embedded in a compressible foam material 502 contacts the user vertex through a cutout in the compressible foam material 502.

The air conduction microphone, such as air conduction microphone 302 from FIG. 3, senses a sound signal representative of the vocal sound received from the user by air. The air conduction microphone 302 can be separate from the cushioned bendable material. The air conduction microphone can be positioned away from the bone conduction microphone 510 in order to receive the vocal sound of the user by air. A piece of rubberized foam can be inserted between the bone conduction microphone 510 and the air conduction microphone such as the air conduction microphone 302 from FIG. 3.

Referring to the example embodiment of FIG. 5, the cushioned bendable material 500 may comprise rubberized foam type materials 502, 504, 508, Velcro embedded rubber housing components 506, 512, a bone conduction sensor and associated printed circuit board (PCB) 510, and optionally a hard plastic material or metal 514. The hard plastic material or metal 514 may come in contact with the bone conductions sensor 510 and the user skin surface in order to enhance speech signal pickup. Where hard plastic material is used, such material is selected to be of threshold durability and/or rigidity, in order to approach or match the corresponding qualities of metal material.

The bone conduction microphone 510 can be provided with adhesive to enable the bone conduction microphone 510 to be removably attached to the Velcro embedded rubber housing components 506, 512. Adhesive material can be any well-known adhesive that would securely attach the bone conduction microphone 510 to the silicon casing layer 506, 512 and enable the headgear to be worn for a period of time, but that would also readily enable the multisensory array to be removed from the head-protective helmet. Adhesive material can comprise, for example, a double-sided adhesive foam backing that would allow for comfortable attachment to the head-protective helmet.

Figure 2:
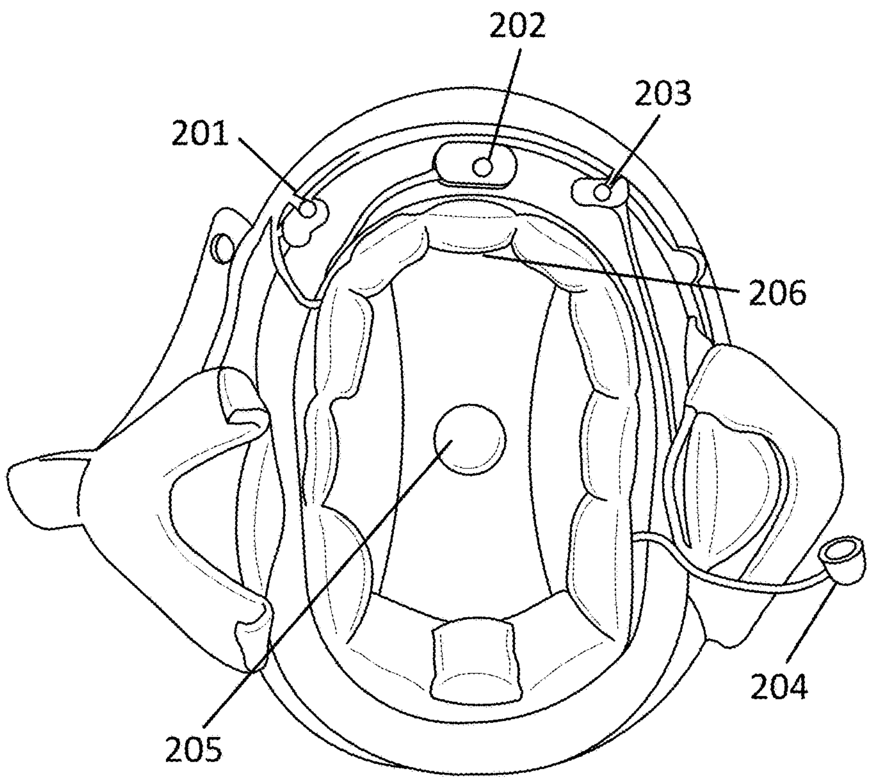
FIG. 2 illustrates an example mounting of a multi-sensor array in a typical helmet.

The above-mentioned deficiencies of conventional mobile devices, such as Bluetooth headset helmet communicators, are overcome by one or more embodiments of the present application. An embodiment of the multisensory array may use two different sensors, a bone-conduction microphone and an air-conduction microphone illustrated in FIG. 2. The air-conduction microphone can be placed near to the user mouth such as on the top lining of a half helmet as illustrated in FIG. 2. As mentioned, a boom microphone is undesirable as being intrusive. The bone-conduction sensor can be placed onto the top lining of the helmet as shown in FIG. 2. In a particular application, the bone-conduction sensor 205 can be positioned to contact the top of a user's head. The air-conduction sensor 202 can be placed onto the top helmet lining as shown in FIG. 2.

FIG. 2 shows possible placement locations of the air-conduction sensor 202 and bone-conduction sensor 205 on a half helmet.

The surface of the bone-conduction sensor 205 is relatively small, normally not more than about 1 mm (thickness) by about 2 mm (width) by about 3 mm (length). This small area presents a challenge to place the bone-conduction sensor 205 in a location with direct contact on the user's skin surface especially when the user is in motion. Further, there are limited points where the sensor can be placed in order to obtain threshold acceptable or good speech quality. FIG. 1 shows areas on the human head that can produce threshold acceptable or good speech quality using a bone conduction sensor.

In one embodiment, the bone microphone 510 can be encapsulated into a housing 500 as shown in FIG. 5. In this structure, the potential contact surface between the sensor 510 and the human skin surface is increased significantly, greatly enhancing the speech signal pickup by the sensor. This structure also makes the direct contact with the user surface easier. This structure increases the robustness of the sensor 510 for signal pickup as a result. This structure also makes the installation of the sensor 510 easier. Further, as the contact surface is large, this structure reduces discomfort of the user in the contact area.

In order to prevent unwanted acoustic-induced mechanical vibrations or mechanical vibrations due to motion from the helmet or the mounting structure from transmitting to the bone conduction microphone, soft foam 206, or other material having similar elasticity, flexibility, and texture, can be inserted between the sensors as shown in FIG. 2.

In this regard, this structure also enhances weak sounds, such as those without emphasis or substantial enunciation, so that the bone sensor can easily pick up such weak sounds, such as the sound "six."

Figure 4A:
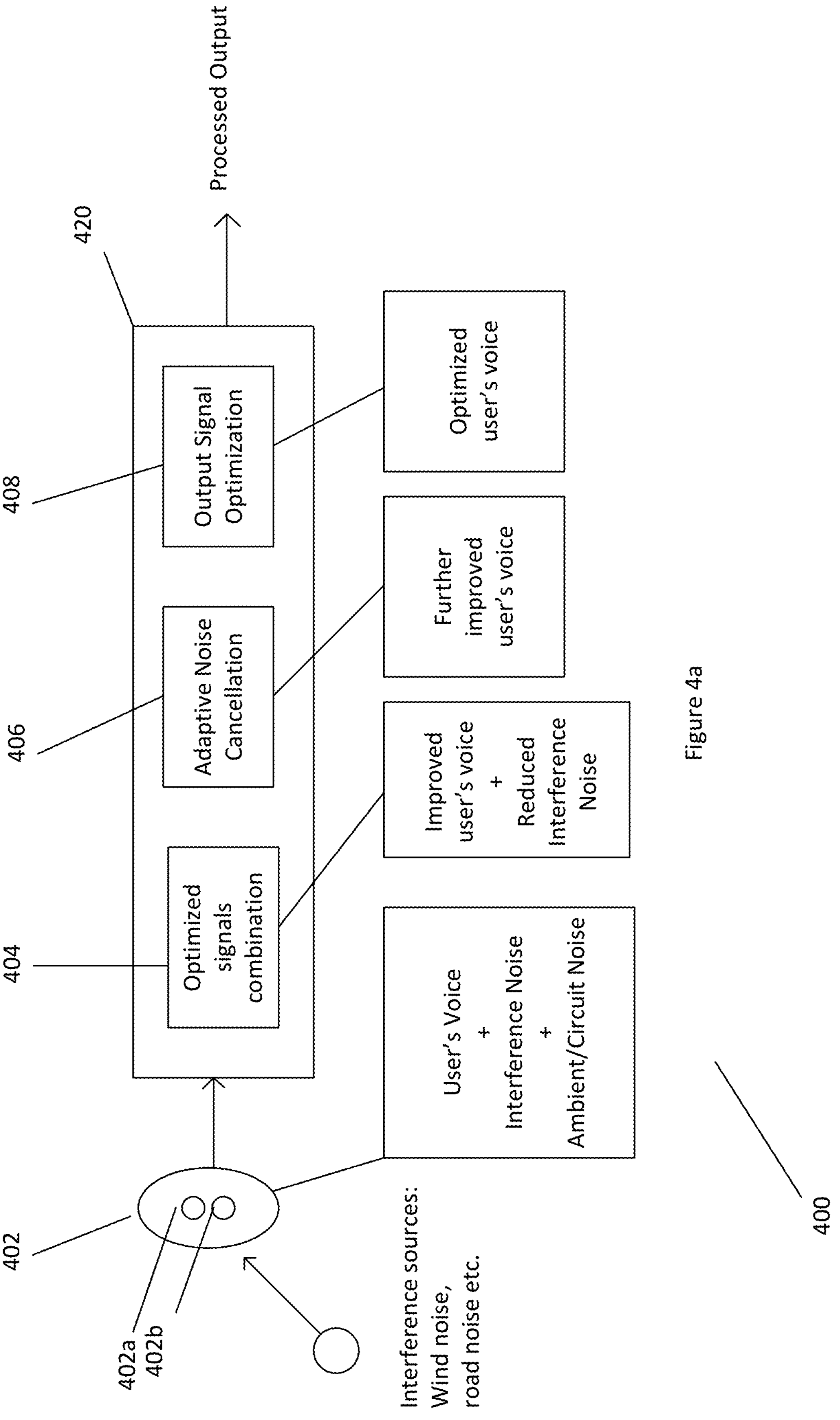
FIG. 4*a* illustrates an example functional block diagram of the multi-sensor array.

FIG. 4*a* illustrates the block diagram of a system 400. System 400 comprises an air conduction microphone 402*a* and a bone conduction microphone 402*b* for speech input to the system. System 400 can also comprise of a pair of loudspeakers, a pair of in-ear earbuds or bone conduction headphones for output of sound. The digital signal processor (DSP) and RF front-end form a complete wireless communicator for working in extremely noisy environment.

The apparatus can still function in the event that either microphone 402*a* or 402*b* fails.

The apparatus can receive mono or stereo audio streaming signals from a base station such as a mobile device. The audio streaming can be speech signals or music. The audio signals can be in raw or processed form, e.g., compressed, and/or encrypted.

FIG. 4*a* shows the functioning block diagram and overall setup of the system 400 capable of acoustic signal acquisition using two different acoustic sensors 402 in any hands-free application such as a helmet communicator. This process can be independent of the placement locations of the acoustic sensors 402.

Figure 4B:
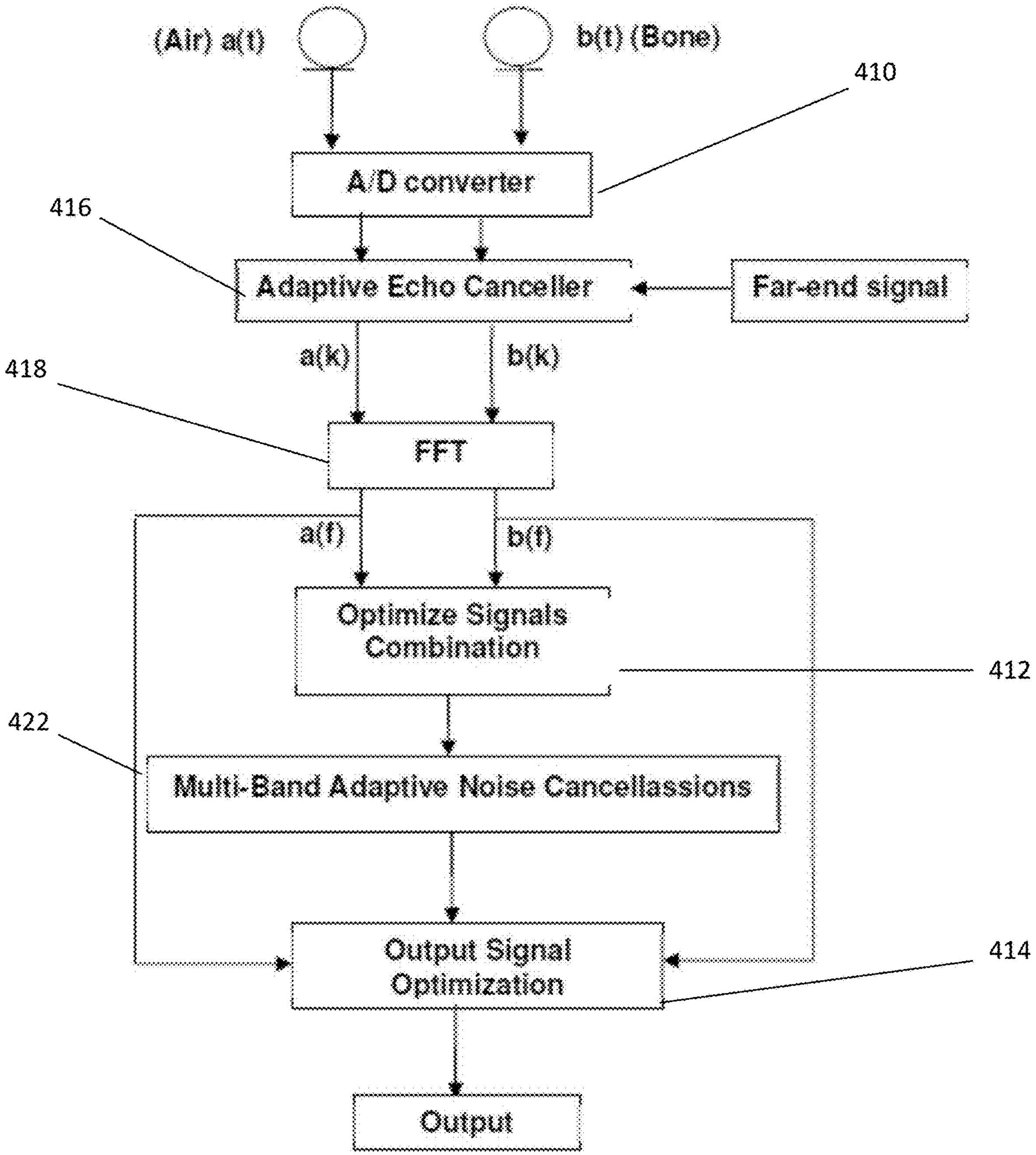
FIG. 4*b* illustrates an example flow diagram in accordance with one or more embodiments described herein.

The processing stages of the processes and the function of each processing stage are described in FIG. 4*b*. FIG. 4*b* shows an overall functional diagram of an example system 400.

Due to the close proximity between the microphones 402*a* or 402*b* and headset speaker, echo sound resulting from acoustic coupling is inevitable when the communicator is used. In this case, an acoustic echo canceller can be used to cancel the echo in the bone conduction microphone 402*b* and air-conduction microphone 402*a*.

FIG. 5 shows an exploded view of the structure of the housing for an example bone-conduction sensor in accordance with an example embodiment. The structure 500 is designed to (a) isolate the sensor from unwanted acoustic induced mechanical vibration or mechanical vibration induced acoustic noise and (b) enhance the high frequency components of the speech signal.

As shown in FIG. 5, parts 502, 504 and 508 are rubberized foam type materials. These materials together with their arrangement as a structure are used to isolate and absorb any noise induced mechanical vibration or other mechanical vibration from reaching the sensor. Parts 506 and 512 are Velcro embedded rubber housing components used to enclose the sensor and its associated printed circuit board (PCB) 510 as shown in FIG. 5. Part 514 can be either hard plastic material or metal. Part 514 can be optional. This component 514 comes in direct contact with the sensor and thereby enlarges a contact surface of the component 514 with the human skin surface so as to enhance speech signal pickup.

Figure 6:
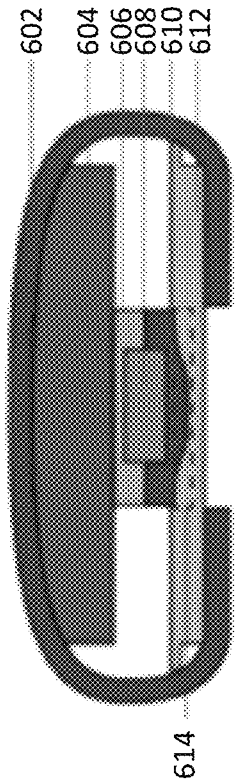
FIG. 6 illustrates a side view of an example housing in accordance with one or more embodiments described herein.

FIG. 6 shows an assembled view of an example sensor housing structure.

As is well known, bone conduction sensors are relatively sensitive to low frequency, but relatively insensitive to high frequency. Speech intelligibility may suffer due to losses of high frequency components of the bone conduction sensor. As mentioned above, the surface area of the bone conduction sensor 512 is small, so the contact surface between the bone sensor 512 and the user skin surface will be correspondingly small. The hard plastic material or metal component 514 of the bone conduction sensor housing structure enlarges the contact surface of the sensor 512 and the user skin surface. As a result, the sensor 512 is more robust to movement and able to enhance the high frequency components of the speech signal to be picked up by the bone conduction sensor.

Further, as the contact surface is enlarged, the contact surface can achieve at least threshold acceptable or good contact with the user skin surface while not being intrusive and while reducing any discomfort to the user during prolonged uses.

The overall assembled structure of the sensor housing can be as illustrated in FIG. 6. The complete housing is made of soft rubberized material such as rubberized foam. Components 602, 604, and 608 are rubberized foam type materials. Components 606 and 612 are Velcro embedded rubber housing components to enclose the sensor and its associated printed circuit board (PCB) 610 as shown in FIG. 6. A hard plastic or metal material 614 can be included to enlarge the contact surface of the sensor 612 and the user skin surface. This is to isolate any unwanted acoustic-induced vibration from reaching the sensor other than from its direct contact surface. In this case the human skin where the sensor comes into contact.

Figure 7:
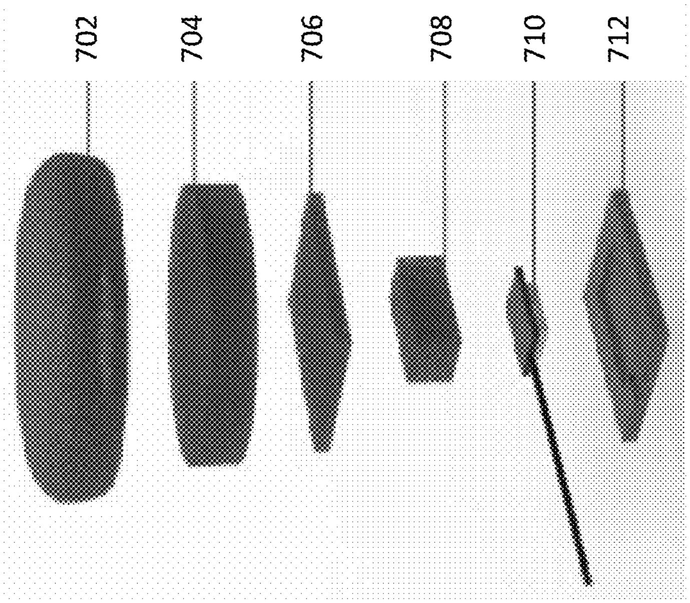
FIG. 7 illustrates an exploded view of an example housing in accordance with one or more embodiments described herein.

As shown in FIG. 7. Parts 702, 704 and 708 are rubberized foam type materials. These materials together with their arrangement as a structure are used to isolate and absorb any noise induced mechanical vibration or other mechanical vibration from reaching the sensor. Parts 706 and 712 are Velcro embedded rubber housing components used to enclose the sensor and its associated printed circuit board (PCB) 710 as shown in FIG. 7.

The structure can be attached to the helmet as illustrated in FIG. 2 as an example. However, there are other ways to attach the sensor structure to a helmet.

As illustrated in FIG. 2, the whole system can form part of the helmet after installation, with nothing attached to the user's body or head, freeing the user from any entangling wire, etc. A pair of headphones 201, 203 can be configured as illustrated in FIG. 2. The apparatus can be wirelessly linked to a user device. The apparatus may also be wire-linked to a user device for example, with a USB connection 204. Other wire connections are also possible.

In a particular application, for ease of installation, the bone-conduction sensor location can be the top of a human head. FIG. 1 shows the locations on the head that the structure with the bone sensor can easily make good contact to achieve good signal pickup.

In one or more embodiments, the bone-conduction signal and the air-conduction signal can be combined in such a way to produce an optimized output signal, which comprises low noise and highly intelligible.

Turning now to FIG. 4*a*, a process for outputting clean and high-quality speech is shown. Process 400 can occur after input is received from the multi-sensor array 402. At 404, a gain equalization calibration is launched on the audio signal. At 406, a combination of the signal from the bone conduction microphone and the air conduction microphone occurs by applying a signal optimization process. The signal processor 420 can include an acoustic echo canceller that removes or substantially removes, from the combined signal, echo signals that result from acoustic coupling between the bone conduction microphone and a speaker that renders the vocal communication of the user, or the air conduction microphone and the speaker. Additional information or configuration settings or options can also be entered. At 408, a further noise and echo cancellation process occurs to accomplish wind noise and other noise suppression. After completion of step 408, clean and high-quality speech can be output.

Referring now to FIG. 4*b*, a flow diagram for an optimized signal output is shown. The signals from an air conduction microphone and a bone conduction microphone can be sent to an adaptive echo canceller component 416. Next, the signals can be sent to a Fast Fourier Transform component 418 and then a signal combination component 412. The signal may then be sent to a multi-band adaptive noise component 422. Next, the signal can be sent to an output signal optimization component 414.

As shown in FIG. 4*b*, audio circuitry sometimes referred to as a codec or audio codec, can include an analog-to-digital (A/D) converter circuit 410. The analog-to-digital converter circuit can be used to digitize an analog signal, such as an analog audio signal. For example, analog-to-digital converter circuit 410 can be used to digitize one or more analog microphone signals. Such microphone signals can be received from the bone conduction microphone or the air conduction microphone. Digital-to-analog converter circuits can be used to generate the analog output signal. For example, a digital-to-analog converter circuit can include a digital signal corresponding to the audio portion of a media playback event, audio for a phone call, a noise canceling signal, a warning tone or signal (e.g., beep or ring), or any other digital information can be received. Based on this digital information, a digital-to-analog converter circuit can generate a corresponding analog signal (e.g., analog audio).

Process 400 can be used to perform digital signal processing on a digitized audio signal. The multi-sensor array 402 can also receive a digital audio voice signal. Using the processing functionality, the bone conduction microphone signal and the air conduction microphone signal can be digitally removed from the digital audio voice signal. The use of processing power of the device in this manner can help to reduce the processing burden. This makes it possible to configure with less cost and less complex circuitry. Power consumption efficiency and audio performance can also be improved. If desired, the digital audio processing circuitry can be used to supplement or replace the audio processing functionality. For example, digital noise canceling circuitry can be used to remove noise to the speaker, such as during the apparatus's hearing protection mode. During the apparatus's hearing protection mode, the device can process signals received by its sensors and filter loud or harmful noise from being transmitted to the user.

Due to manufacturing tolerance and error, the bone conduction microphone 402*b* and the air conduction microphone 402*a* can be calibrated and their gain equalized. A gain equalization calibration 404 can be applied to the bone conduction microphone 402*b* and the air conduction microphone 402*a* to ensure a consistency of gain of respective outputs with respect to one another.

The signals optimized combination process 412 is used to optimize the output signal to achieve the best speech quality and intelligibility by intelligently combining the outputs from the two different types of sensors for both working in a noisy environment and quiet environment. This is achieved using the following example process: Let a(f) be the Fast Fourier Transform (FFT) of the air conduction signal and let b(f) be the FFT of the bone conduction signal. Further, let $A_i(f)$ and $B_i(f)$ be the absolute amplitude of the FFT spectral, and $C_i(f)$ is the selected output which is the smaller of the two. In a first case, if $A_i(f)$ is greater than or equal to $B_i(f)$ then $$C_i(f) = B_i(f)$$

In a second case, if $A_i(f)$ is less than $B_i(f)$ then $$C_i(f) = A_i(f)$$

Where i=0 . . . . N−1 and N is the size of FFT.

The optimized signal gain normalization ($G_i(f)$) is computed as follows:

$$G_i(f) = \frac{C_i(f)}{B_i(f)} \quad \text{Eq. (1)}$$

The optimized output signal ($O_i(f)$) of the two sensors is computed as follows:

$$O_i(f) = G_i(f) * b(f) \quad \text{Eq. (2)}$$

The formulae above established standard signal processing steps of one or more embodiments.

This approach is effective since some of the noise can be more dominant and much larger from the bone conduction sensor than from the air conduction sensor, such as friction noise when the user moves their helmet. Such noise is picked up by the bone conduction sensor but not the air conduction sensor. In this case, the output signal from the air conduction sensor will be used instead of as computed by the above formulae.

There may still be some residual noise in the output of the optimized combined signal. An adaptive noise suppression technique, e.g., Output Signal Optimization 414, can be applied in this last stage to further reduce the noise to the minimum level, or defined threshold low level.

Figure 8:
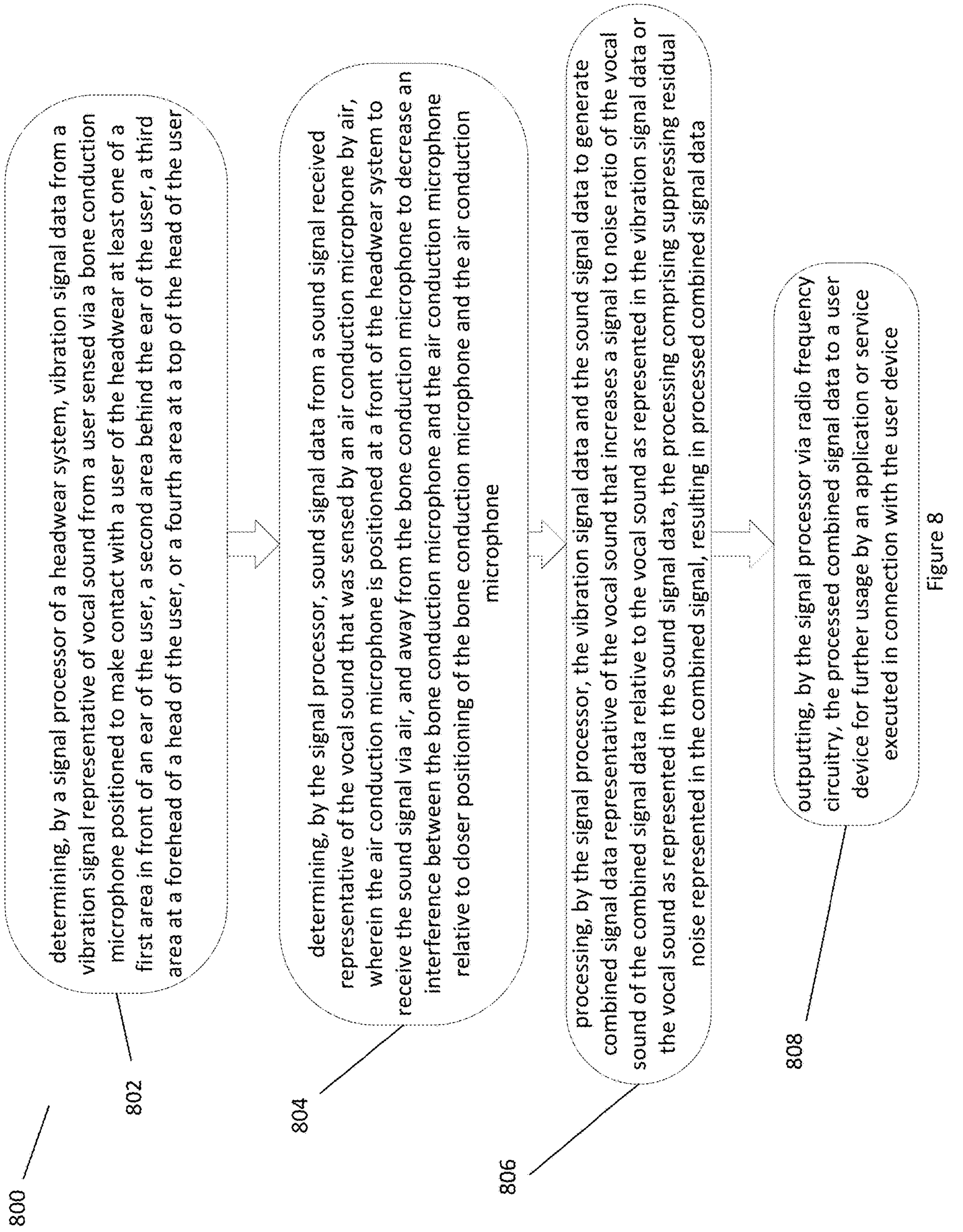
FIG. 8 is a block flow diagram for a method in which an apparatus performs communication in extreme wind and environmental noise in accordance with one or more embodiments described herein.

Referring now to FIG. 8, illustrated is a flow diagram 800 for communication in extreme wind and environmental noise in accordance with one or more embodiments described herein.

At 802, the flow diagram 800 comprises determining, by a signal processor of a headwear system, vibration signal data from a vibration signal representative of vocal sound from a user sensed via a bone conduction microphone positioned to make contact with a user of the headwear at least one of a first area in front of an ear of the user, a second area behind the ear of the user, a third area at a forehead of a head of the user, or a fourth area at a top of the head of the user.

At 804, the flow diagram 800 comprises by the signal processor, sound signal data from a sound signal received representative of the vocal sound that was sensed by an air conduction microphone by air, wherein the air conduction microphone is positioned at a front of the headwear system to receive the sound signal via air, and away from the bone conduction microphone to decrease an interference between the bone conduction microphone and the air conduction microphone relative to closer positioning of the bone conduction microphone and the air conduction microphone.

At 806, the flow diagram 800 comprises processing, by the signal processor, the vibration signal data and the sound signal data to generate combined signal data representative of the vocal sound that increases a signal to noise ratio of the vocal sound of the combined signal data relative to the vocal sound as represented in the vibration signal data or the vocal sound as represented in the sound signal data, the processing comprising suppressing residual noise represented in the combined signal, resulting in processed combined signal data.

At 808, the flow diagram 800 comprises outputting, by the signal processor via radio frequency circuitry, the processed combined signal data to a user device for further usage by an application or service executed in connection with the user device.

Figure 9:
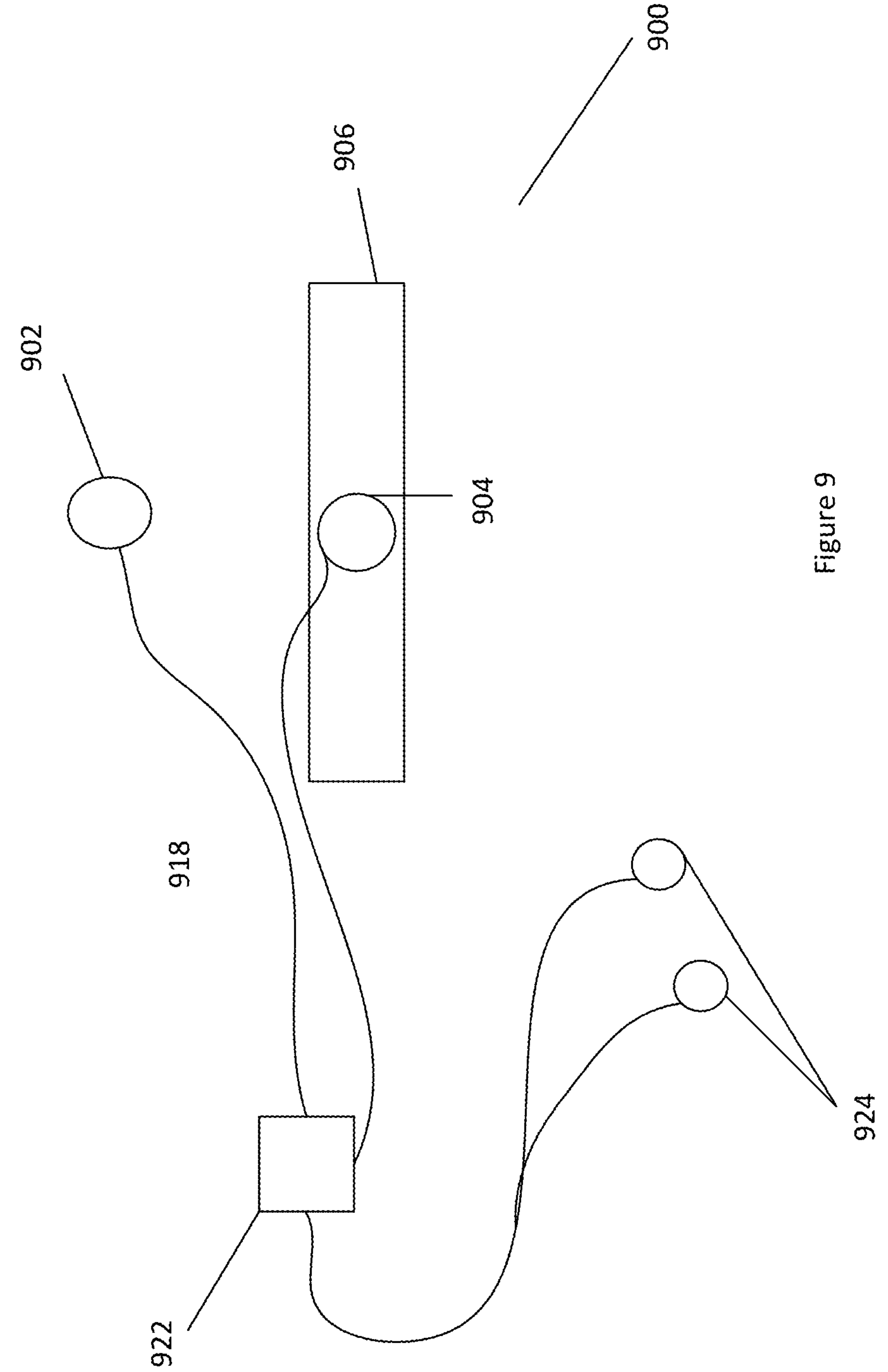
FIG. 9 illustrates a diagram of an embodiment of the multi-sensor array including at least one of a pair of loudspeakers or a pair of in-ear earbuds.

FIG. 9 illustrates an example embodiment of the apparatus. The apparatus can comprise an air conduction microphone 902 and a bone conduction microphone 904 for speech input to the system. The apparatus can also comprise of a pair of loudspeakers, in-ear earbuds, or bone-conduction headphones 924. The digital signal processor (DSP) and RF front-end to form a complete wireless communicator for working in extremely noisy environment. The bone conduction microphone 904 can be embedded in a rubberized foam material 906. The bone conduction microphone 904, the air conduction microphone 902, and loudspeakers, in-ear earbuds, or bone conduction headphones 924 can be connected to a transceiver 922 and transceiver circuitry by suitable leads 918. The system 900 can be embedded or attached to a headgear such as a helmet, headband, etc.

In an embodiment, the combined signal is output from the headgear apparatus to a device for at least one of performing a command by the device associated with a voice command determined to be present in the vocal sound of the combined signal, storing the vocal sound by the other device, or communicating the vocal sound to at least one other device in communication with the device.

Figure 10:
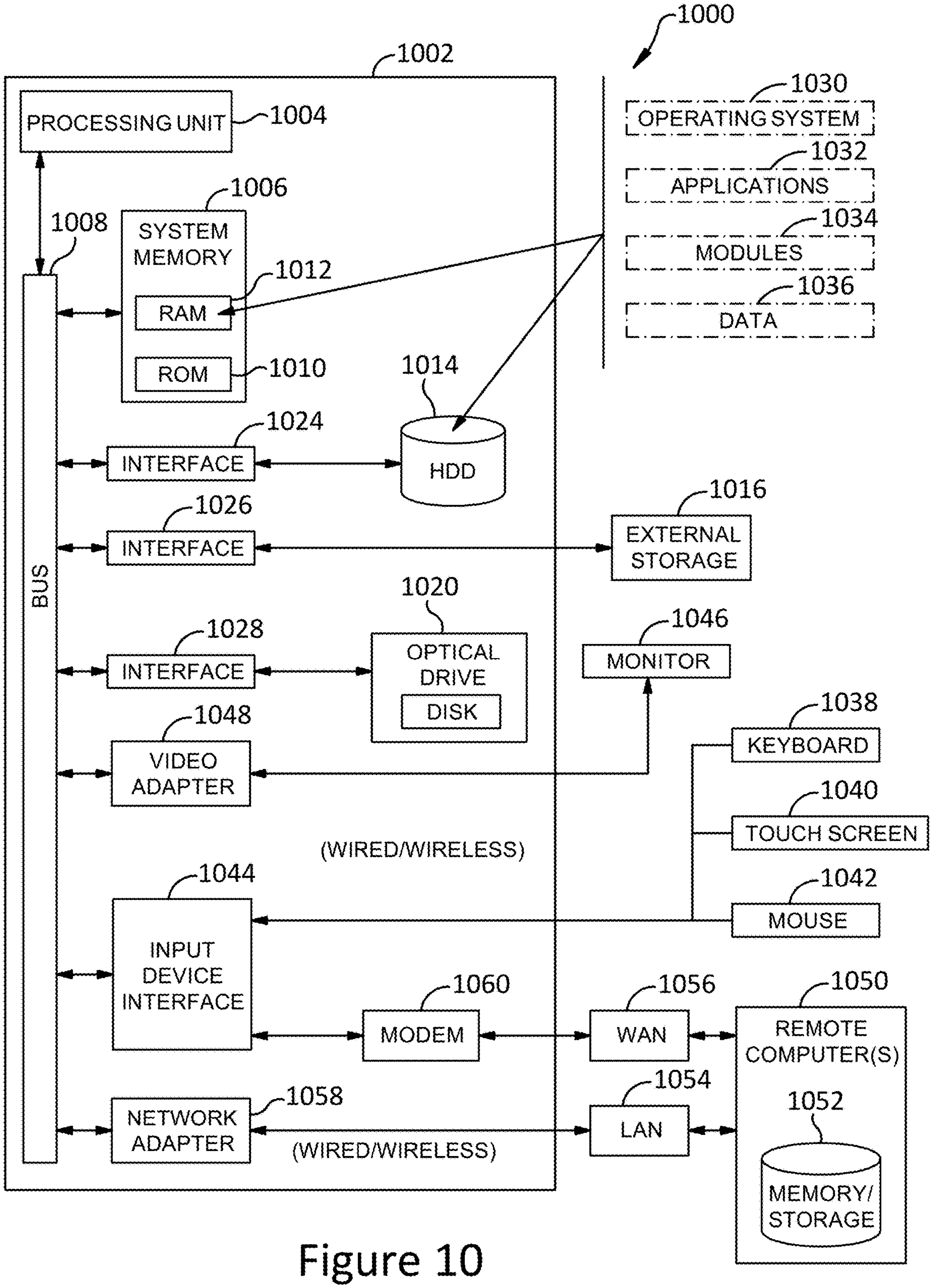
FIG. 10 illustrates a non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CDROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, e.g., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A microphone system for headgear, comprising:

a bone conduction microphone positioned at a first area to contact a user at a top of a head of the user;

an air conduction microphone at a second area located at or near a mouth of the user; and a signal processor that processes first signal data from the bone conduction microphone and second signal data from the air conduction microphone to produce combined data representative of a vocal communication of the user, wherein the signal processor, as part of producing the combined data, at least one eliminates or substantially removes a first noise associated with the bone conduction microphone from the first signal data or eliminates or substantially removes a second noise associated with the air conduction microphone from the second signal data.

2. The microphone system of claim 1, wherein the bone conduction microphone is embedded in a lining of a housing comprising at least one of foam or Velcro embedded rubber, resulting in the bone conduction microphone being positioned at the first area to make pressured contact with the user at the top of the head of the user.

3. The microphone system of claim 1, wherein the bone conduction microphone is embedded in a housing, wherein the housing comprises a hard plastic portion or a metal portion that makes direct contact between the bone conduction microphone and the top of the head of the user, and wherein, relative to a case where the hard plastic portion or the metal portion is absent, the hard plastic portion or the metal portion of the housing enlarges a contact surface between a sound sensor of the bone conduction microphone and a skin surface on the top of the head of the user, resulting in enhancement of high frequency components of a speech signal represented by the first signal data received by the bone conduction microphone.

4. The microphone system of claim 1, wherein the bone conduction microphone is embedded in a cushioned bendable material integral with, or attachable to, an inside of a top part of the protective headgear, resulting in the bone conduction microphone being positioned at the first area to make pressured contact with the user at the top of the head of the user, and wherein the cushioned bendable material comprises a battery in a recess formed in a portion of the cushioned bendable material.

5. The microphone system of claim 1, further comprising: foam material between the bone conduction microphone and the air conduction microphone to mitigate or prevent, from transmitting to the bone conduction microphone, acoustic-induced mechanical vibrations or mechanical vibrations due to motion from the helmet or mounting parts within the helmet.

6. The microphone system of claim 1, wherein the signal processor comprises an acoustic echo canceller that removes or substantially removes, from the combined data, echo signals that result from acoustic coupling between at least one of the bone conduction microphone and at least one speaker that renders the vocal communication of the user, or the air conduction microphone and the at least one speaker.

7. The microphone system of claim 1, wherein the first signal data from the bone conduction microphone is represented using a first fast Fourier transform of a vibration signal received by the bone conduction microphone, wherein the second signal data from the air conduction microphone is represented using a second fast Fourier transform of a tonal signal received by the air conduction microphone, and wherein the producing of the combined data comprises comparing a first absolute amplitude of a first spectrum of the first fast Fourier transform of the vibration signal and a second absolute amplitude of a second spectrum of the second fast Fourier transform of the tonal signal to determine which of the first absolute amplitude and the second absolute amplitude is greater.

8. The microphone system of claim 7, wherein the producing of the combined data comprises applying an optimization procedure to at least one of the first signal data or the second signal data, the optimization procedure comprising, based on a result of the comparing, at least one of assigning a first weight to the first signal data that reduces a first effect of the first signal data on the producing of the combined data, or assigning a second weight to the second signal data that reduces a second effect of the second signal data on the producing of the combined data.

9. The microphone system of claim 7, wherein the comparing results in a determination that the first noise associated with the first signal data from the bone conduction microphone is substantially greater than the second noise associated with the second signal data from the air conduction microphone, and wherein, based on the determination, the first signal data from the bone conduction microphone is eliminated from the producing of the combined data.

10. The microphone system of claim 7, wherein the comparing results in a determination that the first noise associated with the first signal data from the bone conduction microphone is substantially less than the second noise associated with the second signal data from the air conduction microphone, and wherein, based on the determination, the second signal data from the air conduction microphone is eliminated from the producing of the combined data.

11. The microphone system of claim 1, wherein the first signal data is representative of a vibration signal received by the bone conduction microphone, wherein the second signal data is representative of a tonal signal received by the air conduction microphone, and wherein the signal processor performs a comparison a first running average energy of the vibration signal and a second running average energy of the tonal signal to determine whether the first running average energy or the second running average energy is larger, and wherein the producing of the combined data comprises, as a function of a result of the comparison, applying an optimized signal gain normalization as a first function of a first fast Fourier transform of the first signal data from the bone conduction microphone, or applying the optimized signal gain normalization as a second function of a second fast Fourier transform of the second signal data from the air conduction microphone.

12. The microphone system of claim 1, wherein the signal processor further extracts a voice command from the combined data, and performs the voice command to at least one of store the vocal communication associated with the combined data, store at least one sound signal received from at least one other device in communication with the device, or communicate the vocal communication as a sound signal to the at least one other device.

13. The microphone system of claim 1, wherein the air conduction microphone is an omnidirectional microphone.

14. The microphone system of claim 1, wherein the air conduction microphone is a unidirectional microphone.

15. An apparatus for a headgear, comprising:

an air conduction microphone comprising at least one tonal signal sensor at or near a first location of the headgear corresponding to a mouth on a face of a user of the headgear;

a bone conduction microphone comprising at least one vibration signal sensor at a second location of the headgear on a head of the user and off the face of the user away from the mouth; and a signal processor that processes a tonal signal received via the air conduction microphone and a vibration signal received via the bone conduction microphone to produce a combined signal representative of a vocal communication of the user, wherein, as a result of the tonal signal and the vibration signal being processed to produce a combined signal, at least one of a first noise associated with the tonal signal received via the air conduction microphone or a second noise associated with the vibration signal received via the bone conduction microphone are eliminated or substantially removed from production of the combined data.

16. The apparatus of claim 15, wherein the second location of the at least one vibration signal sensor of the bone conduction microphone, which is off the face of the user and away from the mouth, corresponds to a right temple of the user, a left temple of the user, a first ear position behind a right ear of the user, or a second ear position behind a left ear of the user.

17. The apparatus of claim 15, wherein the signal processor is configured to, prior to the production of the combined data, at least one of suppress radio frequency interference received in the at least one vibration signal or enhance a defined high frequency band of frequencies represented in the at least one vibration signal.

18. A method, comprising:

determining, using a signal processor of a headwear system, vibration signal data from a vibration signal representative of vocal sound received via a bone conduction microphone that senses a vibration signal associated with vibration of a skull of a user resulting from the vocal sound, the bone conduction microphone being positioned within the headwear system to make contact with a user of the headwear system at least one of at a first area at a forehead of a head of the user, or at a second area at a top of the head of the user;

determining, using the signal processor, sound signal data from a sound signal representative of the vocal sound received via an air conduction microphone that senses the sound signal by air, the air conduction microphone being positioned at or near a third area near a mouth of the user to receive the sound signal via air; and processing, using the signal processor, the vibration signal data and the sound signal data to generate combined signal data representative of the vocal sound, the processing comprising:

increasing a first signal to noise ratio of the vocal sound as represented by the combined signal data relative to the vocal sound as represented in the vibration signal data, or increasing a second signal to noise ratio of the vocal sound as represented by the combined signal data relative to the vocal sound as represented in the sound signal data.

19. The method of claim 18, further comprising:

after the processing, at least one of:

applying, by the signal processor, adaptive noise suppression to defined frequency bands of the combined signal data for suppression of residual noise represented in the combined signal data, or applying, by the signal processor, high frequency enhancement of frequencies represented in the combined signal data that are in a defined high frequency range.

20. The method of claim 18, further comprising:

prior to the determining of the vibration signal data, the determining of the sound signal data, and the processing, calibrating a first gain measured for a vibration signal corresponding to a sound sensed via the bone conduction microphone and a second gain measured for a sound signal corresponding to the sound sensed via the air conduction microphone, the calibrating comprising modifying a gain of at least one of the bone conduction microphone or the air conduction microphone to ensure a gain consistency with respect to sounds measured by the bone conduction microphone and the air conduction microphone.

* * * * *